United States Patent [19]
Lloyd et al.

[11] 3,987,241
[45] Oct. 19, 1976

[54] SAMPLED DIFFERENTIAL ANALYZER

[75] Inventors: Raymond A. Lloyd, Laurel; Kenneth C. Ryan, Finksburg; Robert Martinez, Cockeysville, all of Md.

[73] Assignee: Westinghouse Electric Corporation, Pittsburgh, Pa.

[22] Filed: Oct. 17, 1974

[21] Appl. No.: 515,748

[52] U.S. Cl. .................................... 178/6; 178/6.8; 178/DIG. 37; 178/DIG. 36; 358/81
[51] Int. Cl.[2] .................................... H04N 7/18
[58] Field of Search .................. 178/6, 6.8, DIG. 34, 178/DIG. 36, DIG. 37, DIG. 33; 340/324 AD; 358/81

[56] References Cited

UNITED STATES PATENTS

| | | | |
|---|---|---|---|
| 3,049,588 | 8/1962 | Barnett | 178/6 |
| 3,715,480 | 2/1973 | Levine | 178/6 |
| 3,823,261 | 7/1974 | Bolsey | 178/6.8 |
| 3,916,439 | 10/1975 | Lloyd et al. | 358/81 |

*Primary Examiner*—Benedict V. Safourek
*Assistant Examiner*—Edward L. Coles
*Attorney, Agent, or Firm*—J. B. Hinson

[57] ABSTRACT

A system for evaluating members or a family of similar devices by comparing images of a model device to the image of the member to be evaluated is disclosed. An image of the model device is first produced and stored in a memory. An image of the member to be evaluated is produced as the stored image of the model device is simultaneously reproduced. The images of the model and the member being evaluated are compared to generate a comparison signal related to the differences therebetween. The comparison signal is sampled at a predetermined rate, to produce a digital signal indicating sample points where the comparison signal exceeds a predetermined value. Statistical techniques are used to analyze the digital signal to determine which portions of this signal correspond to significant differences between the images of the model device and the member being evaluated. The portions of the digital signals corresponding to significant differences between images of the model and device being evaluated are combined with the image of the device being evaluated to produce a multicolor composite image. In the composite image areas of the image of the device being evaluated which are significantly different from the image of the model device are displayed in red with the remainder of the composite image being green.

9 Claims, 3 Drawing Figures

| | | | | | | | | | |
|---|---|---|---|---|---|---|---|---|---|
| INPUT DATA | | 1 | 1 | 0 | 1 | 1 | 1 | 0 | 1 |
| OUTPUT DATA | | 0 | 0 | 0 | 1 | 1 | 1 | 0 | 0 |
| TIME | 0 | 1 | 2 | 3 | 4 | 5 | 6 | 7 | 8 |

SAMPLED DIFFERENTIAL ANALYZER

BACKGROUND OF THE INVENTION

1. Field of the Invention

The invention relates generally to test apparatus and more particularly to apparatus for evaluating members or a family of similar devices by comparing a TV image of the member being evaluated to the TV image of a member known to meet predetermined specifications.

2. Description of the Prior Art

Prior art analyzers for evaluating similar devices by comparing the image or the device being evaluated to the image of a model device have utilized either predominantly digital techniques or predominantly analog techniques. Each of these techniques has unique advantages. The digital system were generally very sophisticated and provide the capability for detail statistical analysis while the analog systems were relatively simple and provided minimum statistical analysis capability. Typically, the output of these systems was either a simple go no-go indicator or a display of the portions of the images which are different. Many applications require the display of an image of the device being inspected with those areas of the device failing to meet prescribed specification being easily identified. This type of display was difficult to achieve utilizing prior art systems because of complications associated with the generation of composite images.

SUMMARY OF THE INVENTION

The system which is the subject of this invention provides a simple solution to many of the problems associated with prior art systems. The disclosed system is relatively simple, however, reasonably complex statistical analysis can be performed on the differences between the images of the model device and device being evaluated to determine if the device is acceptable. This capability is provided by producing an analog image signal of a model device and storing this image signal in a memory. An analog image signal of the device to be evaluated is produced as the stored image signal of the model device is simultaneously read. These two analog image signals are combined by an analog comparator circuit to produce a comparison signal equal to the absolute value of the difference between the two signals. This comparison signal is periodically sampled to produce a digital signal indicating whether the instantaneous value of this signal is above or below a predetermined value. If the comparison signal is below the predetermined value a logic "zero" is produced, conversely, if it is above a predetermined value, a logic "one" is produced. The digital bits resulting from these samples are combined to form digital words. These digital words form the input signal to a digital processor. The digital processor analyzes these signals using predetermined criteria to determine which bits of the digital words are indicative of a significant difference between the image signals of the model and the device being evaluated. The bits of the input signal corresponding to significant differences between the images of the model device and the device being evaluated form logic "one" bits in the output signal of the processor. The output signal of the processor is coupled to the input of a digital to analog converter to generate an analog signal. This analog signal is coupled to the red gun of a conventional color television monitor. The real-time output of the television camera is delayed and coupled to the green gun of the monitor such that the image of the device being evaluated and the output signal of the digital to analog converter are synchronized. This produces a composite image on the television monitor with the areas of the device which meet the predetermined criteria displayed in green. Areas where the device being evaluated which fail to meet predetermined criteria are displayed in red.

DESCRIPTION OF THE DRAWING

FIG. 1 is a block diagram illustrating the analyzer.

DETAILED DESCRIPTION OF THE PREFERRED EMBODIMENTS

Figure 2:
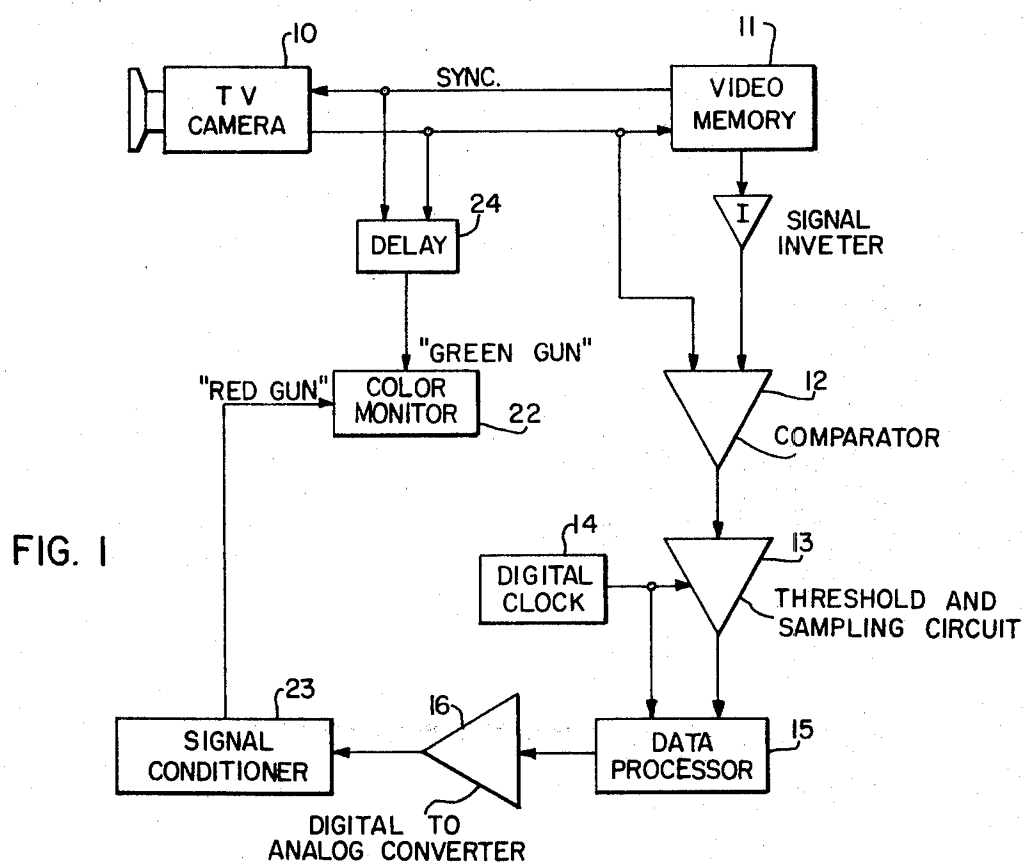
FIG. 2 is a diagram illustrating a portion of a scan line of the image signals of the model device, the device being evaluated and the output of the comparator.

FIG. 1 is a functional block diagram of the analyzer. The image signals of the model device and the device being evaluated are produced by a television camera 10. In normal operation the image signal of the model device is first produced by focusing the television camera 10 on the model device and storing the resulting video signal in an analog video memory 11. After the image signal of the model device has been completely stored, the television camera 10 is focused on the device to be evaluated and the video memory 11 switches from the record to the playback mode. Synchronization signals are provided to the television camera 10 and by the video memory 11 so that the image signals of the model device being read from the memory 11 will be synchronized with the image signals of the device being evaluated. A continuous comparison of the image signals of the model device and the device being evaluated is made by coupling the output signal of the video memory 11 and the output signal of the television camera 12 to a comparator 12. The output of the comparator 10 is an analog signal whose amplitude is equal to the absolute value or the difference between these two image signals. The output signal of the comparator 12 is coupled to a threshold and sampling circuit 13 to produce at the output of this circuit a two level signal with the first level indicating that the input signal is below a given threshold during the sample period and the second level indicating that the input is above this threshold. The sampling rate is determined by a digital clock 14. (Five megacycles is a typical sampling rate.)

During each sample period, the output signal of the threshold and sampling circuit 13 is shifted into a shift register to form the bits of a digital word. Each bit of these data words correspond to a specific portion of the image signals being compared. These digital data words form the input signal to the processor 15 and will be analyzed by the processor to determine if the bit patterns of the input word to the processor indicate a significant variation between the image signals of the model device and the device being evaluated. Any individual bits of these data words found to correspond with statistically significant differences between the image signals of the model device and the device being evaluated will be formated by the data processor 15 into digital output words. These output words will be processed by a digital to analog converter 16 to produce a signal indicating which portion of the image signal of the device being evaluated significantly differ from the corresponding portions of the image signal of the model device. This signal is coupled to the red gun of a conventional color television monitor 22 through a signal conditioner 23. The function of the signal conditioner is to filter out spikes and convert the signal to an amplitude compatible with the color television monitor. The criteria used to determine when the image signal of the device being evaluated is significantly different from the image signal of the model device will be explained in detail later.

The image signal of the device being evaluated is also coupled to the green input of the television monitor 22 through a video delay 24. The video delay 24 and the processing rate of the data processor 15 are adjusted such that the signals arriving at the red and green inputs of television monitor 22 are synchronized. This synchronization results in a composite image being formed on color monitor 22 in which the portion of the image corresponding to areas where the image of the model device and device being evaluated are not significantly different is displayed in green with the area of the image where significant differences occur being displayed as an area having a uniform red color. This type of display permits significant deviations in the object device to be easily spotted by visual inspection.

FIG. 2 illustrates a portion of the image signal 29 of the model device and the image signal 25 of the device being evaluated along with the corresponding output of the comparator circuit 12. These signals form the inputs to the comparator 12. The corresponding output signal of the comparator 12 is illustrated at reference 26. This signal is sampled by the threshold and sampling circuit 13 to produce a digital signal indicating which portions of the image signal of the device being evaluated significantly differ from the corresponding portion of the image signal of the model device.

Figure 3:
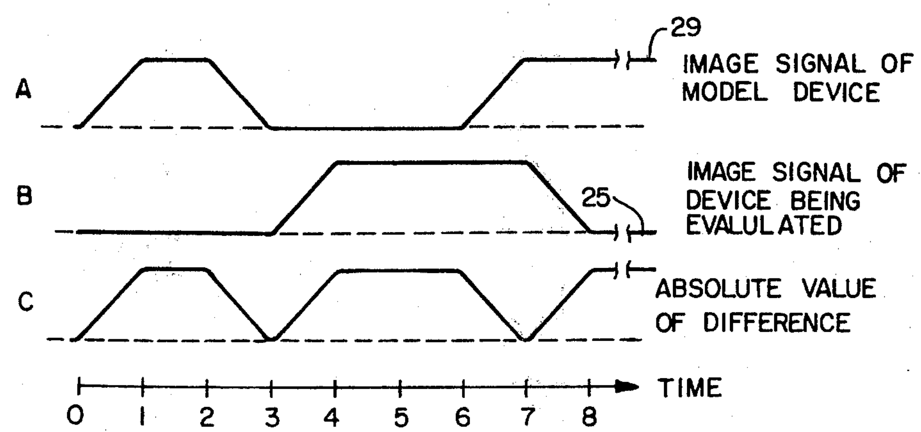
FIG. 3 is a typical example of the digital data words forming the input signal to the data processor and the output word of the data processor.

FIG. 3 illustrates the digital signal generated by the threshold and sampling circuit 13 when the output signal of the comparator 12 is periodically sampled at times illustrated on the time scale by numerals 1–8. As illustrated in FIG. 3, the resulting digital word will contain 8-bits with a logic "one" corresponding to a sample time in which the output signal of the comparator has a high value indicating that there is a significant difference between the image signals of a model device and the device being evaluated and a logic "zero" when this signal has a low value. This digital signal identified as "input data" bits in FIG. 3 is processed by the digital processor 15 to produce a data word identified as "output data" bits in FIG. 3. Each bit of the output data word corresponds to a specific sample time of the output signal of the threshold and sampling circuit 13. A logic zero bit in this data word causes the red signal gun of the color monitor 22 to be cut off during the time period corresponding to this bit. Therefore, the corresponding portion of the composite image appearing on the color monitor 22 will be green indicating that this portion of the subject device is within acceptable limits of being identical to the model device. Alternatively a logic one in a bit position of this word indicates that the red gun of the color monitor 22 will be turned on indicating that the corresponding portion of the image of the device being evaluated is significantly different from image of the model device. The specific criteria used in converting the input data signal to the output data signal was to consider as insignificant any logic one bit not associated with a group of at least three adjacent logic one bits. Since each bit of the input signal corresponds to a sample period which is in turn associated with a unique portion of the images, this criteria permits dimensional tolerances to be set on the differences between the image signals which will be interpreted as an error. The ability to conveniently set these tolerances by programming the data processor 15 permits the tolerance level between the images of the model device and the image of the device being evaluated to be easily adjusted. This capability provides a flexible, accurate evaluation system which can be applied to a wide range of problems.

The above described system can be assembled using commercially available components. Such components are well known to those skilled in the art. Therefore, it is not believed necessary to discuss specific examples of such components. Image signals other than television video signals could also be used.

What we claim is:

1. A differential image analyzer comprising in combination:

a. apparatus for producing and storing an image signal related to a model device of the type to be analyzed;

b. apparatus for producing an image signal related to the device to be evaluated and for comparing these image signals to produce a digital signal indicative of the difference between said images;

c. apparatus for evaluating said digital signal to determine what portions of said digital signal corresponds to significant difference between said model device and said device to be evaluated; and d. apparatus for producing a composite image by combining the portions by said digital signal corresponding to significant differences between said model device and said device to be evaluated and an image related to said device being evaluated such that significant differences between said model device and the device being evaluated are emphasized and related to specific areas of the device.

2. A differential analyzer in accordance with claim 1 wherein said apparatus for producing and storing an image signal related to a model device of the type to be analyzed includes a television camera.

3. A differential analyzer in accordance with claim 2 wherein said apparatus for producing and storing an image signal related to a model device includes an analog video memory.

4. A differential analyzer in accordance with claim 3 wherein said apparatus for producing a composite image includes means for comparing the output signal of said memory means to the output signal of said television camera to produce a difference signal equal to the absolute value of the difference therebetween.

5. A differential analyzer in accordance with claim 4 wherein said apparatus for producing a composite image includes means to periodically sampling said difference signal to produce bits of digital words.

6. A differential analyzer in accordance with claim 5 including processor means for analyzing said digital words to determine which words are indicative of significant difference between the image signals corresponding to said model device and the device being analyzed.

7. A differential analyzer in accordance with claim 6 wherein said processor includes means for analyzing said digital words to determine which words correspond to significant differences between the image signals related to said model device and the device being evaluated by comparing the number of adjacent "one" bits in any data word to a predetermined number.

8. A differential analyzer in accordance with claim 7 further including means for coupling any bits of said digital data words corresponding to significant differences between the image signals corresponding to said model device and said device being evaluated to the input of a digital to analog converter to produce an analog signal.

9. A differential analyzer in accordance with claim 8 wherein the output signal of said television camera is coupled to the green gun of a color television monitor and the output signal of said digital to analog converter is coupled to the red gun of said monitor to produce said composite image.

* * * * *